United States Patent
Dai et al.

(10) Patent No.: US 7,536,520 B2
(45) Date of Patent: May 19, 2009

(54) METHOD AND APPARATUS FOR NATIVE METHOD INVOCATION AND CHANGING MEMORY BANK

(75) Inventors: Hsien-Wen Dai, Yonghe (TW); Lung-Chung Chang, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 1241 days.

(21) Appl. No.: 10/930,880

(22) Filed: Aug. 31, 2004

(65) Prior Publication Data

US 2005/0204350 A1    Sep. 15, 2005

(30) Foreign Application Priority Data

Mar. 10, 2004    (TW) .............................. 93106404 A

(51) Int. Cl.
*G06F 12/12*    (2006.01)
(52) U.S. Cl. ....................................... 711/156; 711/157
(58) Field of Classification Search ...................... None
See application file for complete search history.

(56) References Cited

U.S. PATENT DOCUMENTS 7,350,200 B2 *    3/2008    Lueh et al. .................. 717/148

* cited by examiner

*Primary Examiner*—Hyung S Sough
*Assistant Examiner*—Ngoc V Dinh
(74) *Attorney, Agent, or Firm*—Thomas, Kayden, Horstemeyer & Risley

(57) ABSTRACT

A method and apparatus for native method invocation and changing memory bank. A method return frame of a smart card stores the status of a native method invocation, and a memory bank flag points a program counter to a runtime environment (RE) memory bank or an operating system (OS) memory bank. First, upon a method invocation, the method return frame is pushed and set as a native method invocation when the method invocation is the native method invocation. Then, the memory bank flag points the program counter to the OS memory bank. Next, the method return frame is popped after the native method has been executed. Finally, the memory bank flag is changed to point the program counter to the RE memory bank if the method return frame is set as the native method invocation.

10 Claims, 4 Drawing Sheets

METHOD AND APPARATUS FOR NATIVE METHOD INVOCATION AND CHANGING MEMORY BANK

This application claims the benefit of Taiwan application Serial No. 93106404, filed Mar. 10, 2004, the subject matter of which is incorporated herein by reference.

BACKGROUND OF THE INVENTION

1. Field of the Invention

The invention relates in general to a method and apparatus for native method invocation and changing memory bank, and more particularly to a method and apparatus capable of enhancing the memory usage by keeping a native method operating mechanism and changing between memory banks in a smart card.

2. Description of the Related Art

The usage of the smart card is getting more and more popularized with the wider and wider popularization of the actual applications of the modern cryptography, such as electronic commerce and electronic missive. A Java card belonging to the smart card is one of the actual applications and plays a relatively important role.

FIG. 1 is a system structure diagram showing a conventional Java card. As shown in FIG. 1, in addition to the hardware 100 in the bottom layer, the software system of the Java card may be divided into two parts including a Java card API (Application Programming Interface) 102 and a Java card system classes 104 constituted by Java codes, and a Java card virtual machine (JCVM) 106, a native method 108, and a Java card operating system 110 according to the native codes used by the microprocessor in the bottom layer hardware 100. In the actual application, a microprocessor with hardware encrypting function or a microprocessor together with a coprocessor with decrypting capability serves as a main portion of the bottom layer hardware 100, and an indispensable virtual machine such as the so-called JCVM 106 in the Java system is provided to complete the overall Java card system. No matter what kind of method is used, the limitation to the specification of Java Card Code is that the system can only address to 16 bits. That is, the programs relating to the Java Code, such as Java card API 102, Java card system classes 104, Java card application program (Applet, AP) 112, and the like, can occupy only 64K bytes in the memory owing to the limitation of the addressing capability of the Java card.

FIG. 2 is a flow chart showing conventional steps of a native method invocation of a Java card application program. First, in step 20, when the upper layer invocates the native method A (e.g., the Java card application program, the Java card API, or the Java card system classes invocates the native method A), the associated Java card native method interface (e.g., the interface of the native method A in the Java card system classes) is firstly invocated. Next, in step 22, when the virtual machine interpreter loop of the system has detected the invocation of the native method A, the system enters the recognition procedure of the native method to find the corresponding native codes of the native method A. Finally, in step 24, the system further transfers the program counter (PC) to the native method and executes the PC, and the invocation steps of the overall native method are thus completed. In general, the native code of the native method can be put outside the field of the visible 64K bytes of the Java card according to the processing capability of the microprocessor in the Java card.

At present, in the actual application of the Java card, some manufacturers have started to develop microprocessors, which are capable of supporting the complete Java card bytecodes, in conjunction with a coprocessor with decrypting capability to constitute a complete bottom layer hardware core. Thus, in the Java card having this technology, its associated software portion including the Java card virtual machine, the native method, and the like are constituted by the Java card bytecodes. However, because this system is restricted by the 16-bit addressing capability of the Java card, all the software system programs have to be put within the 64K bytes of the memory, which make the usable space of the system very small.

SUMMARY OF THE INVENTION

It is therefore an object of the invention to provide a method and apparatus for native method invocation and changing memory bank. In the method and apparatus, an unused memory field in the original method frame is used to record whether or not the native method invocation is to be performed, and a memory bank flag to point the program counter to a memory address according to whether or not the native method invocation is to be performed, such that the actual application can utilize the space of the memory above 64K bytes. Thus, the memory usage in the smart card system may be effectively enhanced without adding any hardware cost.

The invention achieves the above-identified object by providing a method for switching between memory banks in a native method invocation in a smart card, wherein a method return frame stores a status of a native method invocation, and a memory bank flag points a program counter to a runtime environment (RE) memory bank or an operating system (OS) memory bank. The method includes the steps of: performing a method invocation; pushing the method return frame and setting the method return frame as the native method invocation when the method invocation is the native method invocation; using the memory bank flag to point the program counter to the OS memory bank; popping the method return frame after the native method has been executed; and changing the memory bank flag to point the program counter to the RE memory bank if the method return frame is set as the native method invocation.

The invention also achieves the above-identified object by providing an apparatus for a native method invocation and switching between memory banks in a smart card. The apparatus includes a method invocation device, a RE memory bank, an OS memory bank, a memory field and a memory bank flag. The memory field stores a status of the native method invocation when the method invocation device executes the native method invocation. The memory bank flag points a program counter to the RE memory bank or the OS memory bank, and points the program counter from the OS memory bank to the RE memory bank after a native method has been executed.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
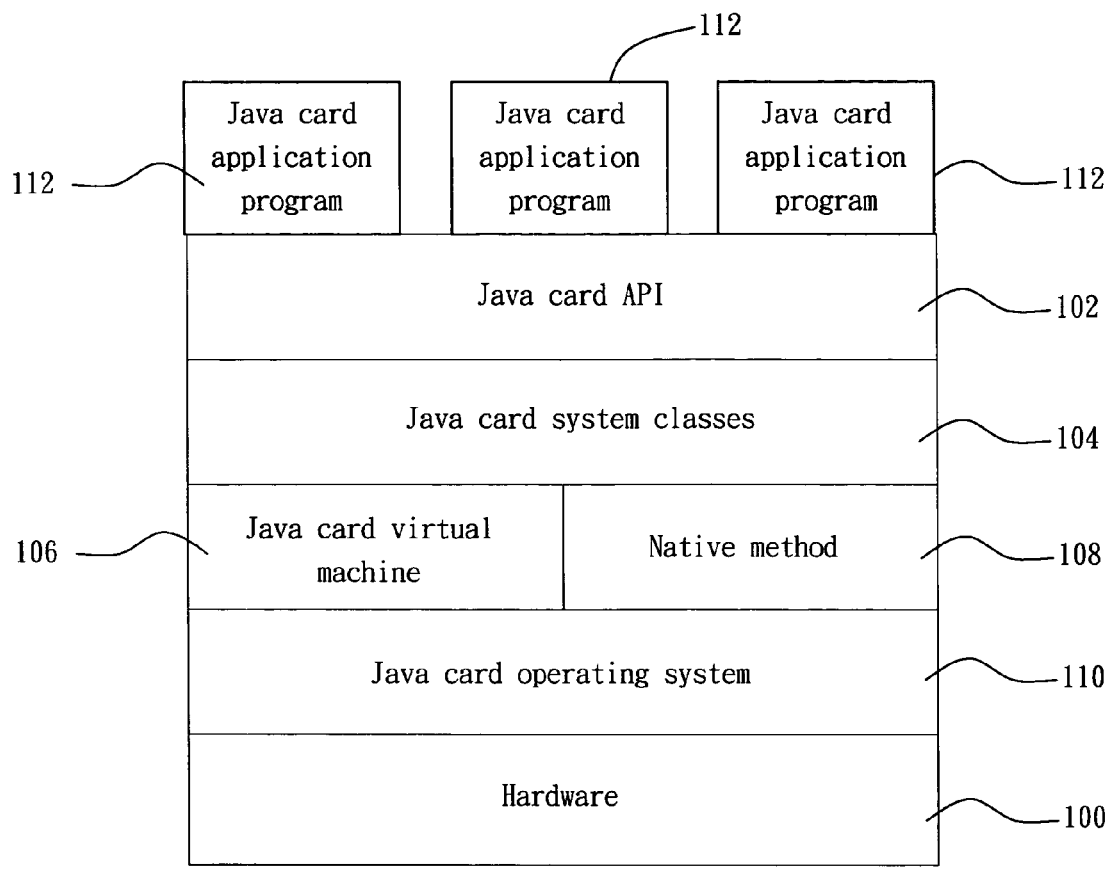
FIG. 1 is a system structure diagram showing a conventional Java card.
Figure 2:
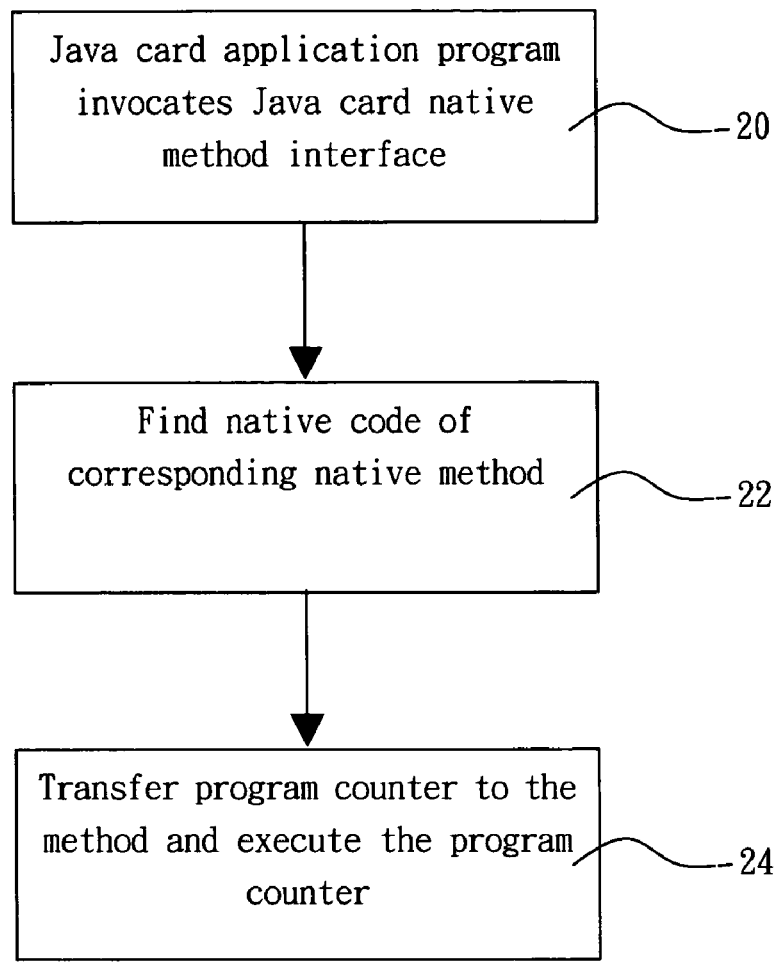
FIG. 2 is a flow chart showing conventional steps of a native method invocation of a Java card application program.

Referring again to FIG. 1, in the actual application of a Java card system having a complete bottom layer hardware core constituted by a microprocessor with Java card bytecodes and a coprocessor with decrypting capability, the procedure after the Java card is inserted is started from the Java card virtual machine 106. Then, the control right of the Java card is transferred to the upper layer of the Java card system classes 104. The control right will not be transferred back to the Java card virtual machine 104 until the card is removed unless the system or application program invocates the associated native method. In addition, the control right is transferred back to the Java card system classes 104 or the invocated application program after the native method invocation only when the native method has been finished. Thus, the native method has the following features.

1. The native method is the only channel for communicating the upper layer of Java system with the lower layer of native system. The upper layer of Java system includes a Java card application program, a Java card API and a Java card system classes. The lower layer of native system includes a native method, a Java card virtual machine, a Java card operating system and hardware.

2. Once the native method is entered and executed, the upper layer of Java system will be returned only when the native method executes the end return. During this period of time, all other method invocations (method calls) belong to the subroutine invocations (function calls) in the native system. The method is a subroutine of the Java language.

Therefore, the invention utilizes the above-mentioned feature of the native method and utilizes the native method as a basis for separating the Java system from the native system in the Java card.

Figure 3:
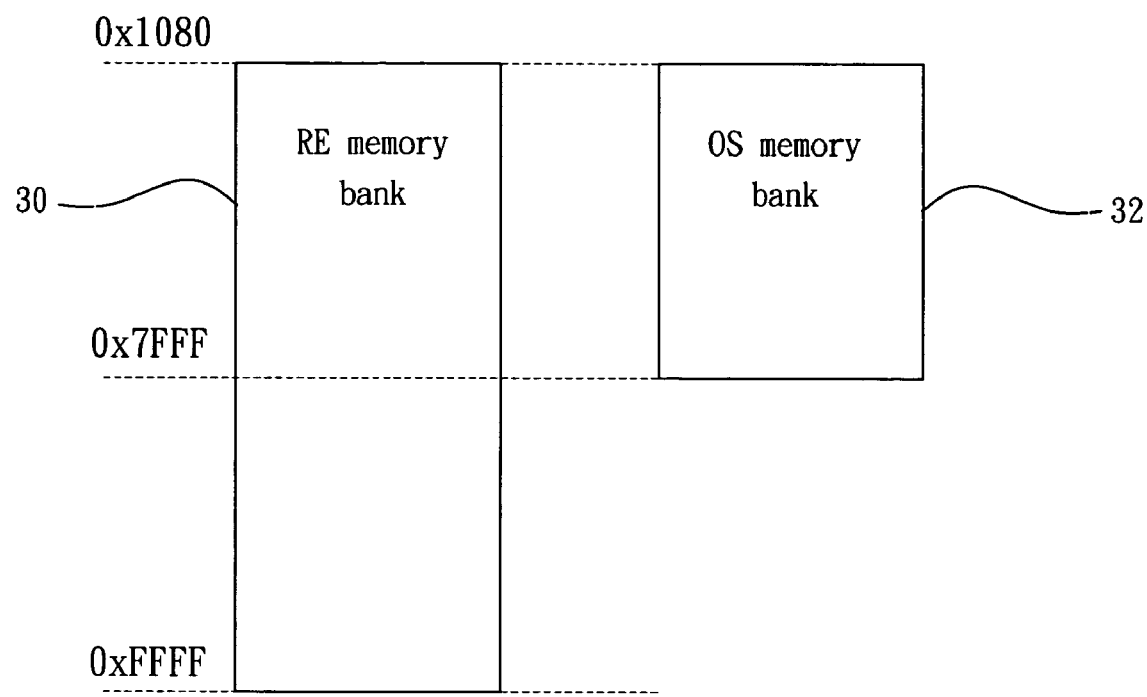
FIG. 3 is a structure diagram showing a memory of a Java card of the invention.

FIG. 3 is a structure diagram showing a memory of a Java card of the invention. Referring to FIG. 3, the hardware of the Java card includes a microprocessor and a memory. The invention divides the memory of the Java card into two memory banks including a runtime environment (RE) memory bank 30 and an operating system (OS) memory bank 32. The RE memory bank 30 ranges from the addresses 0x1080 to 0xFFFF, while the OS memory bank 32 ranges from addresses 0x1080 to 0x7FFF. In terms of the logic, the OS memory bank 32 and the RE memory bank 30 have repeated addresses from 0x1080 to 0x7FFF, but they are independent memory banks. When the Java card is operating, a memory bank flag is used to point the address of the program counter (PC) to a predetermined memory bank. For example, flag 0 points to the RE memory bank 30, and flag 1 points to the OS memory bank 32. In general, the required memory of the OS memory bank 32 is smaller than that of the RE memory bank 30. In this embodiment, the addresses from 0x1080 to 0x7FFF will be described.

When the native method ends, it is necessary to switch back to the original RE memory bank 30. Therefore, the overall method return mechanism must include the mechanism of determining whether or not the memory bank flag has to be switched. In the Java card, when any method is invocated, the method frame for recording the associated information of the method will be pushed to the stack of the memory.

Figure 4:
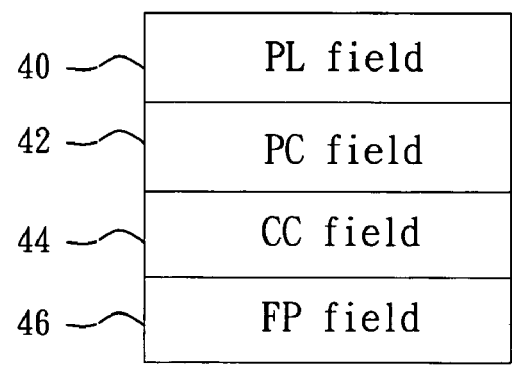
FIG. 4 is a structure diagram showing a method return frame of the Java card of the invention.

FIG. 4 is a structure diagram showing a method return frame of the Java card of the invention. As shown in FIG. 4, the method frame of the Java card usually has eight bytes. The PL field 40 has 2 bytes for respectively storing the number of inputted parameters and the number of local variables of this method with one byte. The PC field 42 has 2 bytes for storing the address of the return program counter. The CC field 44 has 2 bytes, in which one byte is used to record a current content of the method, and the other byte is unused. The FP field 46 has 2 bytes for storing the frame pointer of this method. In the invention, the one unused byte of the CC field 44 is used to record whether or not the method return frame is the native method return, and the byte for recording whether or not the method return frame is the native method return is the memory bank return field. For example, if the method return frame is the native method return, the byte is not 0; or otherwise the byte is 0. Because the method frame of the invention is different from the conventional method frame, the method frame of the invention is referred to as the method return frame.

According to the features of the invention as mentioned in FIGS. 3 and 4, a memory bank flag is used to record whether the bank in the 64-Kbyte memory address belongs to the RE memory bank or the OS memory bank such that the actual application can utilize the space above the 64 Kbytes in the memory. In addition, the one unused byte in the method frame is used to record whether or not the method return frame is the native method return so as to transfer the control right to the proper object.

Figure 5:
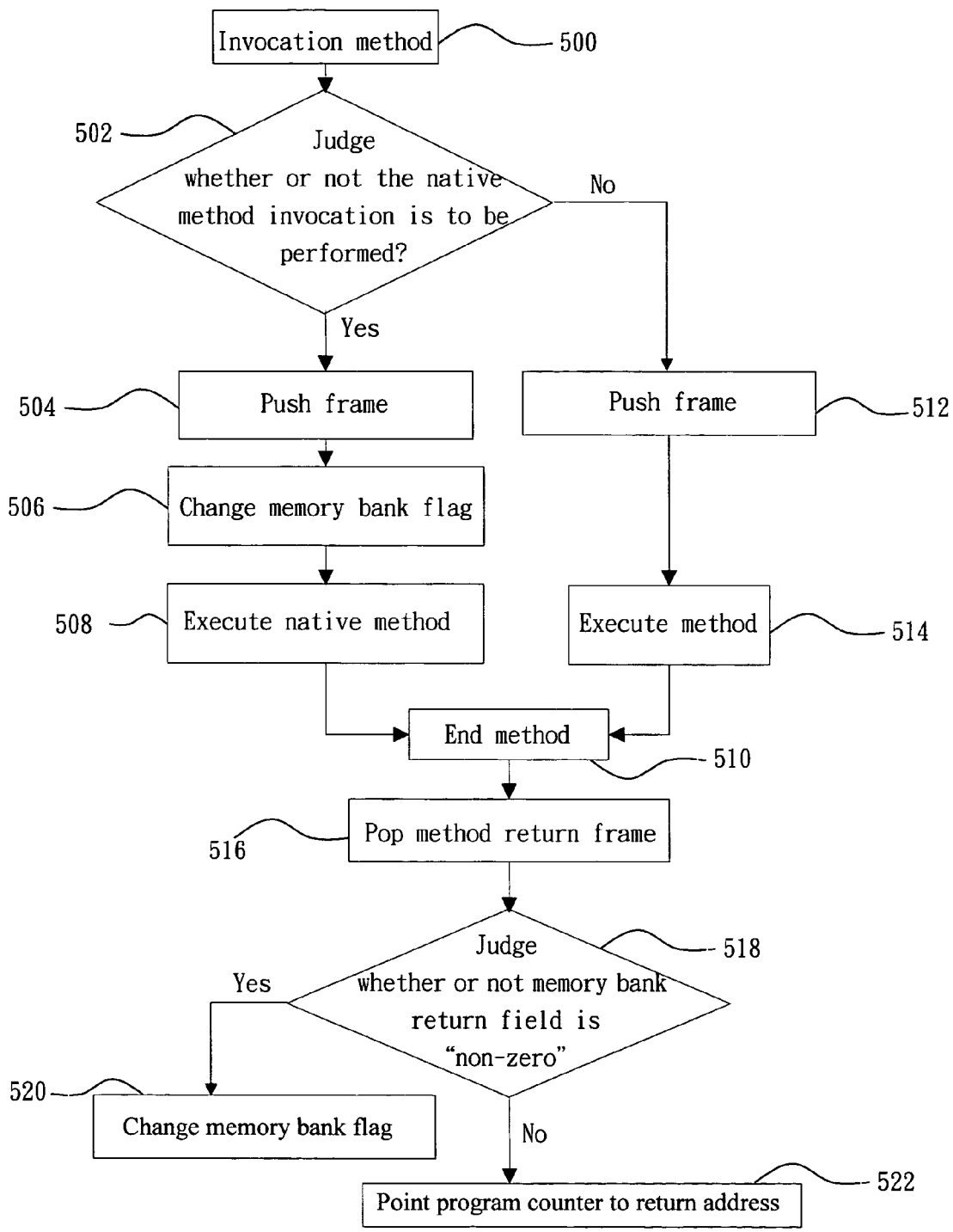
FIG. 5 is a flow chart showing the switching between memory banks in the native method invocation of the Java card of the invention.

FIG. 5 is a flow chart showing the switching between memory banks in the native method invocation of the Java card of the invention. As mentioned hereinabove, the enabling of the Java card system is started from the Java card virtual machine, and then the control right is transferred to the upper layer of Java card system classes. The control right will not return to the lower layer of Java card virtual machine until the upper layer of Java system native method is invocated. Thus, in the executing environment of the Java card, when the method invocation (method calling) is encountered, as shown in step 502, it is judged that whether or not the native method invocation is to be performed. If yes, as shown in step 504, the method return frame is pushed, and the memory bank return field of the CC field 44, which records whether or not the method return frame is the native method return, is set to be "non-zero" to represent as the "native method invocation". Next, as shown in step 506, because the original memory bank is located inside the RE memory bank (i.e., the memory bank flag is 0), the step changes the memory bank flag to 1, which is the currently used OS memory bank, so as to utilize the portion of the memory outside 64K bytes. Thereafter, as shown in step 508, the native method is performed, during which other Java card virtual machines or other subroutines (functions) of the Java card operating system may be invocated to complete the native method.

In step 502, if it is judged that the unnative method invocation is to be performed, the method return frame is pushed, and the memory bank return field of the CC field 44, which records whether or not the method return frame is the native method return, is set to be "0" to represent as the "unnative method invocation", which belongs to the upper layer of method invocation, as shown in step 512. Next, as shown in step 514, the program of the method is executed.

In step 510, after the program of the native method or the unnative method has been executed, the method return frame is popped, as shown in step 516. Next, in step 518, it is judged that whether or not the memory bank return field of the CC field in the method return frame is "non-zero". If yes, the memory bank return field is "non-zero", as shown in step 520, and the memory bank flag is change from 1 to 0. Then, as shown in step 522, the memory bank is switched, the program counter is pointed to the return address, and the process returns to the RE memory bank to continue to execute the next program. In step 518, the memory bank return field is "0". Then, as shown in step 522, the program counter is directly pointed to the return address. That is, the next program is continued to be executed in the RE memory bank.

Using the invention to divide the memory into the Java system and the native system and respectively put the Java system and the native system into different memory banks having the same address can enhance the memory usage of the Java card. Thus, the Java card using the method of the invention at least has the following advantages.

1. Compared to the prior art, the memory usage may be increased such that the memory space over 64K bytes can be used in the Java card.

2. Owing to the executing of the native method, all the method invocations (method calls) belong to the subroutine invocation in the native system. Thus, the invocation executing time in the native method of the Java card may be shortened.

Although the method of the invention is described using the Java card as an example, the method also can be actually applied to various smart card. For example, the memory bank flag may be used to address the memory, the unused byte in the method return frame may be used to store the typical method return or the native method so as to increase the memory usage in the smart card.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for switching between memory banks in a native method invocation in a smart card, wherein a method return frame stores a status of a native method invocation, and a memory bank flag points a program counter to a runtime environment (RE) memory bank or an operating system (OS) memory bank, the method comprising the steps of:
    performing a method invocation;
    pushing the method return frame and setting the method return frame as the native method invocation when the method invocation is the native method invocation;
    using the memory bank flag to point the program counter to the OS memory bank;
    executing a native method, and popping the method return frame after the native method has been executed; and
    changing the memory bank flag to point the program counter to the RE memory bank if the method return frame is set as the native method invocation.

2. The method according to claim 1, wherein the method return frame stores the status of the native method invocation using 1 byte.

3. The method according to claim 1, wherein the method return frame stores a number of inputted parameters, a number of local variables, an address of a return program counter, a current content, a frame pointer, and the status of the native method invocation in the method.

4. The method according to claim 1, further comprising the steps of:
    pushing the method return frame and setting the method return frame as a "unnative method invocation" when the method invocation is not a native method invocation; and
    popping the method return frame after the method is finished, wherein the program counter points to the RE memory bank.

5. A method for switching between memory banks in a native method invocation in a smart card by using a memory bank flag to point a program counter to a runtime environment (RE) memory bank or an operating system (OS) memory bank, the method comprising the steps of:
    performing a method invocation;
    using a memory field to store a status of the native method invocation when the method invocation is the native method invocation;
    using the memory bank flag to point the program counter to the OS memory bank;
    executing a native method; and
    changing the memory bank flag to point the program counter to the RE memory bank when the memory field stores the native method invocation.

6. The method according to claim 5, further comprising the steps of:
    storing the memory field as a status of a "unnative method invocation" when the method invocation is not a native method invocation; and
    using the program counter to point the RE memory bank after the method is finished.

7. An apparatus for a native method invocation and switching between memory banks in a smart card, the apparatus comprising:
    a method invocation device;
    a runtime environment (RE) memory bank;
    an operating system (OS) memory bank;
    a memory field for storing a status of the native method invocation when the method invocation device executes the native method invocation; and
    a memory bank flag for pointing a program counter to the RE memory bank or the OS memory bank, and pointing the program counter from the OS memory bank to the RE memory bank after a native method has been executed.

8. An apparatus for a native method invocation and switching between memory banks in a smart card, the apparatus comprising:
    a method invocation device;
    a runtime environment (RE) memory bank;
    an operating system (OS) memory bank;
    a method return frame for storing a status of the native method invocation when the method invocation device executes the native method invocation; and
    a memory bank flag for pointing a program counter to the RE memory bank or the OS memory bank, and pointing the program counter from the OS memory bank to the RE memory bank after a native method has been executed.

9. The apparatus according to claim 8, wherein the method return frame stores the status of the native method invocation using 1 byte.

10. The apparatus according to claim 8, wherein the method return frame stores a number of inputted parameters, a number of local variables, an address of a return program counter, a current content, a frame pointer, and the status of the native method invocation.

* * * * *